(12) United States Patent
Ku

(10) Patent No.: US 8,122,560 B2
(45) Date of Patent: Feb. 28, 2012

(54) WINDSHIELD WIPER BRIDGE BASE ASSEMBLY

(75) Inventor: Shu-Lan Ku, Hsingchuang (TW)

(73) Assignee: Dongguan Hongyi Wiper Co., Ltd., Dong Guan, Guang Dong (CN)

( * ) Notice: Subject to any disclaimer, the term of this patent is extended or adjusted under 35 U.S.C. 154(b) by 1265 days.

(21) Appl. No.: 11/498,960

(22) Filed: Aug. 4, 2006

(65) Prior Publication Data

US 2008/0047090 A1    Feb. 28, 2008

(51) Int. Cl.
*B60S 1/40*    (2006.01)
*B60S 1/38*    (2006.01)

(52) U.S. Cl. .................... 15/250.32; 15/250.43

(58) Field of Classification Search ............... 15/250.32, 15/250.43, 250.44, 250.201, 250.361, 250.451
See application file for complete search history.

(56) References Cited

U.S. PATENT DOCUMENTS

| | | | |
|---|---|---|---|
| 4,796,326 A | 1/1989 | Beneteau et al. | |
| 4,807,326 A | 2/1989 | Arai et al. | |
| 4,866,812 A | 9/1989 | Arai | |
| 4,909,653 A | 3/1990 | Biggs | |
| 5,325,564 A | 7/1994 | Swanepoel | |
| 5,485,650 A | 1/1996 | Swanepoel | |
| 5,592,715 A | 1/1997 | Yoshida et al. | |
| 5,715,563 A * | 2/1998 | Marks ...................... | 15/250.32 |
| 5,970,569 A | 10/1999 | Merkel et al. | |
| 6,161,248 A | 12/2000 | Merkel et al. | |
| 6,192,546 B1 | 2/2001 | Kotlarski | |
| 6,202,251 B1 | 3/2001 | Kotlarski | |
| 6,253,411 B1 | 7/2001 | Aichele et al. | |
| 6,266,843 B1 | 7/2001 | Doman et al. | |
| 6,295,690 B1 | 10/2001 | Merkel et al. | |
| 6,308,373 B1 | 10/2001 | Merkel et al. | |
| 6,314,608 B1 | 11/2001 | Fisher et al. | |
| 6,397,428 B2 | 6/2002 | Kotlarski | |
| 6,427,282 B1 | 8/2002 | Kotlarski | |
| 6,553,607 B1 | 4/2003 | De Block | |
| 6,581,237 B1 | 6/2003 | Kotlarski | |
| 6,609,267 B1 | 8/2003 | Journee et al. | |
| 6,625,841 B1 | 9/2003 | Zimmer | |
| 6,625,842 B1 | 9/2003 | De Block | |
| 6,634,055 B1 | 10/2003 | De Block | |
| 6,634,056 B1 | 10/2003 | De Block | |
| 6,668,419 B1 | 12/2003 | Kotlarski | |
| 6,675,433 B1 | 1/2004 | Stewart et al. | |
| 6,782,581 B2 | 8/2004 | Block | |
| 6,789,289 B2 | 9/2004 | Roodt | |
| 6,792,644 B2 | 9/2004 | Roodt | |
| 6,799,348 B1 | 10/2004 | Swanepoel et al. | |
| 6,810,556 B1 | 11/2004 | Kotlarski | |
| 6,836,924 B2 | 1/2005 | Egan-Walter | |
| 6,836,925 B1 | 1/2005 | Swanepoel | |

(Continued)

FOREIGN PATENT DOCUMENTS

DE    10043426    *    3/2002

(Continued)

*Primary Examiner* — Gary Graham (74) *Attorney, Agent, or Firm* — Brinks Hofer Gilson & Lione (57) ABSTRACT

A bridge base is utilized on a wiper blade support for mounting a housing through which a wiper arm is installed. The assembly of the bridge base and wiper blade support becomes a standard assembly that matches a plurality of housings of any (automobile) brands so as to achieve cost effectiveness and maximize selections of the wiper blade supports and the housings.

18 Claims, 10 Drawing Sheets

U.S. PATENT DOCUMENTS

| | | |
|---|---|---|
| 6,836,926 B1 | 1/2005 | DeBlock |
| 6,836,927 B2 | 1/2005 | DeBlock et al. |
| 6,886,213 B2 | 5/2005 | Merkel et al. |
| 6,904,639 B2 | 6/2005 | Dietrich et al. |
| 6,966,096 B2 | 11/2005 | Baseotto et al. |
| 6,973,698 B1 | 12/2005 | Kotlarski |
| 6,978,512 B2 | 12/2005 | Dietrich et al. |
| 7,028,368 B2 | 4/2006 | Lee et al. |
| 7,143,463 B2 | 12/2006 | Baseotto et al. |
| 7,150,066 B1 | 12/2006 | Huang |
| 7,581,279 B2 * | 9/2009 | Baseotto et al. ............ 15/250.32 |
| 7,587,783 B1 * | 9/2009 | Lin ............................ 15/250.43 |
| 7,607,194 B2 * | 10/2009 | Weber et al. ................ 15/250.32 |
| 2003/0009842 A1 | 1/2003 | Egner-Walter |
| 2003/0159229 A1 | 8/2003 | Weiler et al. |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0211021 A1 | 10/2004 | Weber et al. |
| 2005/0251946 A1 | 11/2005 | Heinrich et al. |
| 2006/0021178 A1 | 2/2006 | Verelst et al. |
| 2006/0037167 A1 | 2/2006 | Nacamuli |
| 2006/0059647 A1 | 3/2006 | Ostrowski |
| 2006/0064840 A1 | 3/2006 | Park |
| 2006/0090282 A1 | 5/2006 | Hoshio |
| 2006/0117515 A1 | 6/2006 | Fink et al. |
| 2006/0207050 A1 | 9/2006 | Shanmugham et al. |
| 2006/0248675 A1 | 11/2006 | Vacher et al. |
| 2007/0113366 A1 | 5/2007 | Walworth et al. |

FOREIGN PATENT DOCUMENTS

| | | | |
|---|---|---|---|
| DE | 10043427 | * | 3/2002 |
| DE | 10044884 | * | 3/2002 |
| EP | 0260143 | | 3/1988 |
| EP | 0465095 | | 1/1992 |
| EP | 0528643 | | 2/1993 |
| EP | 1147955 | | 10/2001 |
| EP | 1418100 | | 5/2004 |
| EP | 1547883 | | 6/2005 |
| EP | 1547884 | | 6/2005 |
| EP | 1564094 | | 8/2005 |
| EP | 1574410 | | 9/2005 |
| EP | 1627786 | | 2/2006 |
| EP | 1695881 | | 8/2006 |
| EP | 1719672 | | 11/2006 |
| WO | WO97/00796 | | 1/1997 |
| WO | WO01/51324 | | 7/2001 |
| WO | WO01/58732 | | 8/2001 |
| WO | WO02/04267 | | 1/2002 |
| WO | 02/053421 | * | 7/2002 |
| WO | WO03/084791 | | 10/2003 |
| WO | WO2004/045927 | | 6/2004 |
| WO | WO2005/080161 | | 9/2005 |
| WO | WO2005/102802 | | 11/2005 |
| WO | WO2006/056406 | | 6/2006 |
| WO | WO2006/088274 | | 8/2006 |
| WO | WO2007/051669 | | 5/2007 |

\* cited by examiner

WINDSHIELD WIPER BRIDGE BASE ASSEMBLY

FIELD

A windshield wiper assembly is utilized to combine a wiper blade support and a housing. The disclosure, in particular, relates to a device allowing a specific wiper blade support to be combined with any housing.

BACKGROUND

The windshield wiper assemblies currently sold on the market varies with different (automobile) brands. Furthermore, the windshield wiper assembly consists of consumables that require constant replacements after use; for example, the wiper blade needs to be replaced due to damage or breakage, and so on. Apparently, windshield wiper assembly offers huge business opportunities. In addition, the designers of windshield wiper assemblies have progressed with the emergence of modified automobiles in recent years so as to meet consumer demand. However, the windshield wiper assemblies currently sold on the market are designed and manufactured exclusively for certain (automobile) brands. Therefore, the windshield wiper assemblies must have varied dimensions and configurations to adapt for automobile of different sizes and to meet the requirements of automobiles of different brands. Under the circumstances, the manufacturers who wish to occupy a high market share must simultaneously launch as many varieties of a windshield wiper assembly as possible so as to fit in numerous popular models of automobiles. This shall no doubt cause a significant hike in mold costs.

Figure 1:
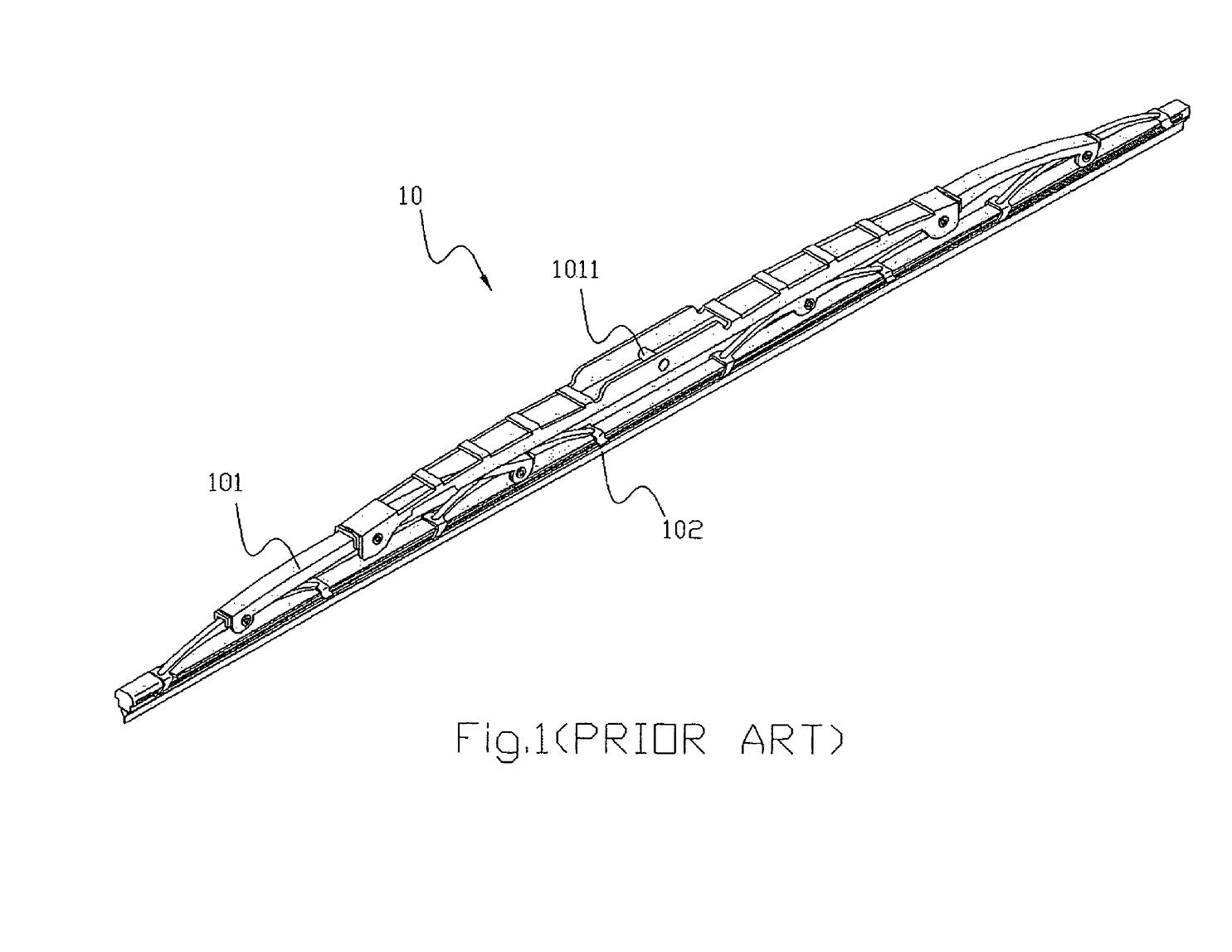

With reference to FIG. 1, a prior art windshield wiper assembly 10 consists of a metal wiper blade frame 101 and a wiper blade 102. Additionally, an adapter 1011 is formed on top of the wiper blade frame 101 for coupling the windshield wiper assembly to a wiper arm. However, the wiper arm of each automobile model has a specific adapter. Hence, there must be a huge stock of variably configured parts and products to support production and sales. This burdens the manufacturers with heavy inventory in addition to mold costs.

SUMMARY

In view of the drawbacks of the said windshield wiper assembly of a prior art, the main objective of the invention is to provide a bridge base allowing a specific wiper blade support to be combined with the housing of any (automobile) brand so as to achieve cost effectiveness in production and application of the wiper blade and maximize alternatives to such a combination.

In one form, a bridge base includes a connection portion defining longitudinal sides, a pair of buckle bands provided on the longitudinal sides and adapted for mounting the bridge base to a wiper blade support. The bridge base is adapted to mount a wiper arm to the wiper blade support.

In another form, a bridge base assembly includes a wiper blade support and a bridge base mounted on the wiper blade support. The bridge base includes a pair of buckle bands for engaging the wiper blade support and at least a pair of extension arms extending from the buckle bands for engaging a housing of a wiper arm.

In still another form, a wiper blade assembly includes a wiper blade support, a bridge base mounted on the wiper blade support, a housing having at least one pair of buttons, and a wiper arm. The bridge base has at least one pair of grooves. The at least one pair of buttons engage the corresponding grooves of the bridge base. The wiper arm is mounted to the housing.

Further aspects, objects, and desirable features of the invention will be better understood from the detailed description and drawings that follow in which various embodiments of the disclosed invention are illustrated by way of example.

DRAWINGS

FIG. 1 is a perspective view of a prior art windshield wiper assembly of;

DESCRIPTION

Figure 2:
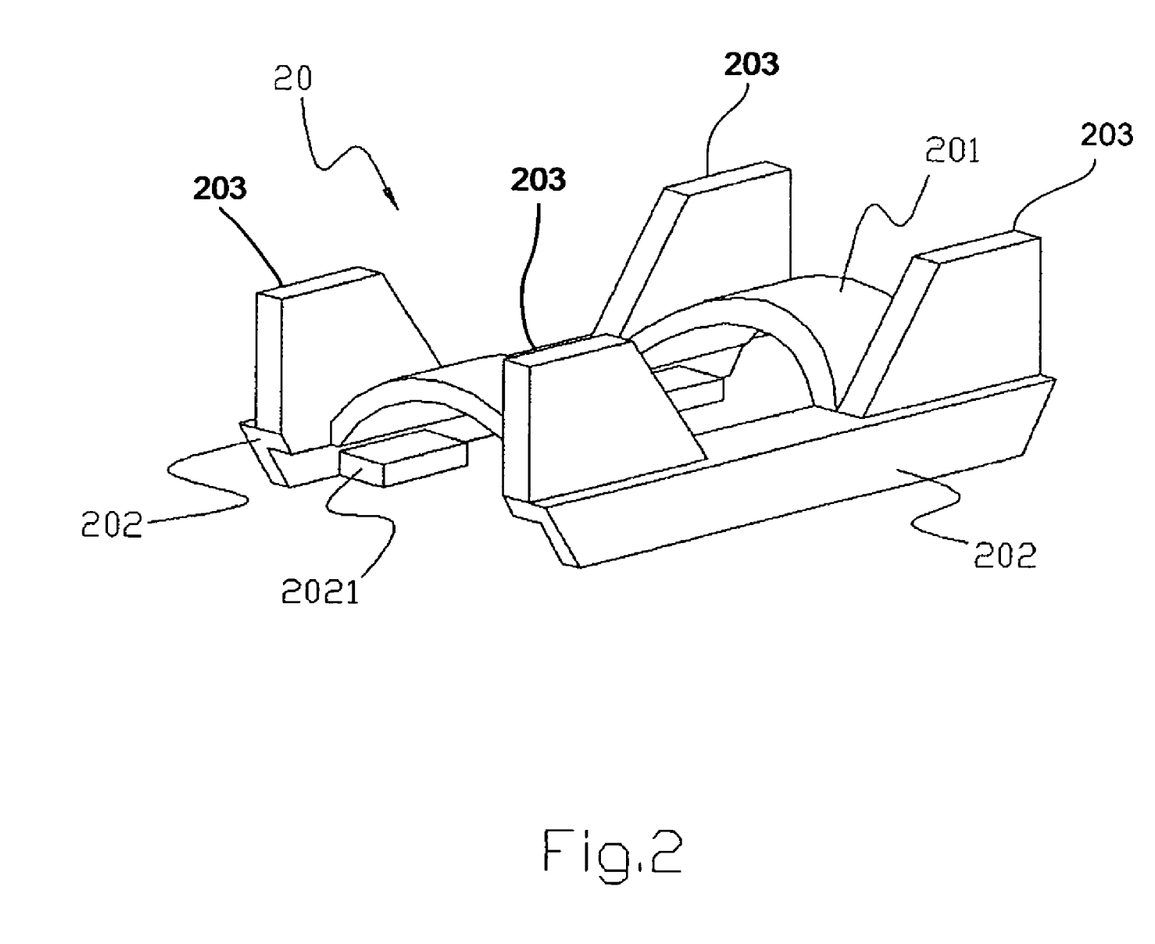
FIG. 2 is a perspective view of the present invention.

With reference to FIG. 2, the bridge base 20 is integrally formed and comprises a connection portion 201 and buckle bands 202 formed respectively on the two sides of connection portion 201. The buckle bands 202 have a plurality of horizontal pins 2021, which are formed by bending inwardly the same from the bottom edge of the buckle bands 202 and a tenon 2022 (see FIG. 3), which is formed by downwardly bending the same from the bottom surface of the buckle bands 202. This structure assures the bridge base 20 to be well fastened both horizontally and vertically. The bridge base 20 is then used to engage a variety of housings that receive a variety of adaptors adapted for a variety of wiper arms. The bridge base 20 includes a plurality of extension arms 203 extending upwardly from the buckle bands 202.

Figure 3:
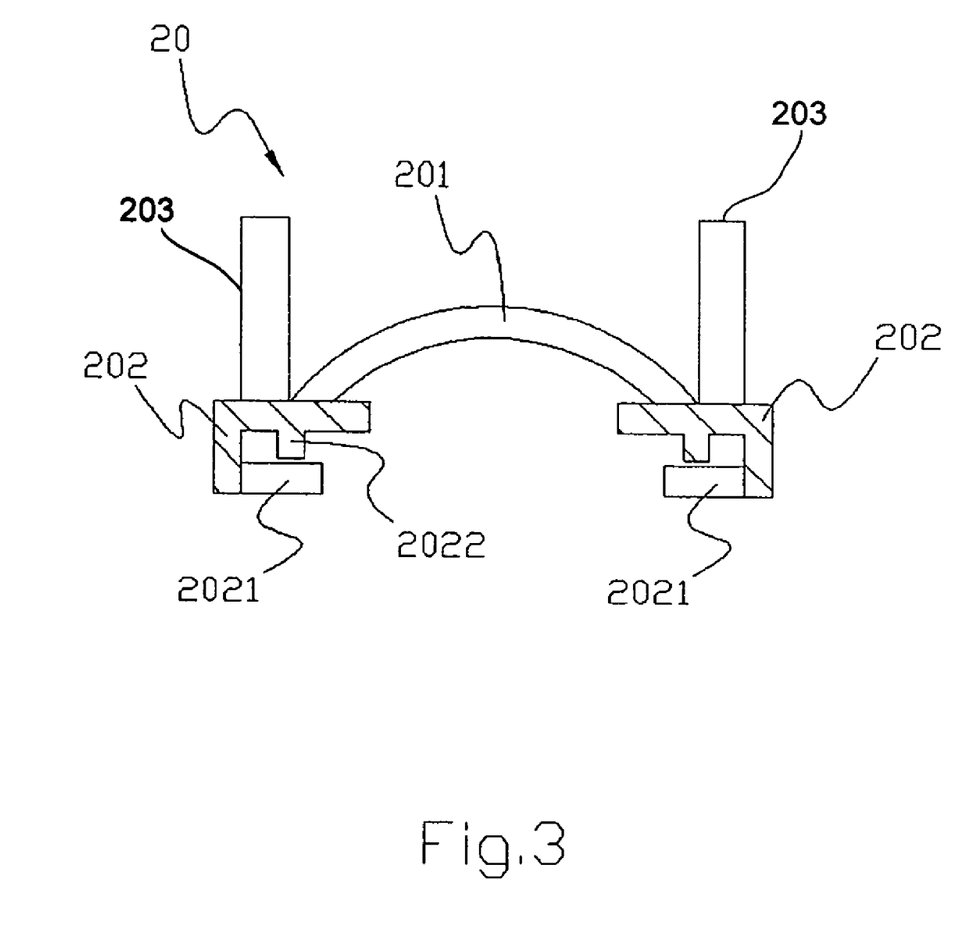
FIG. 3 is a cross sectional view of the present disclosure.

With reference to FIG. 3, a pair of opposing tenons 2022 are vertically formed on the bottom surface of the bridge base 20 to horizontally position the bridge base 20 relative to a wiper blade support 30. The horizontal pins 2021 are formed by folding the same inwardly from the bottom edges of the buckle bands 202 to vertically position the bridge base 20 relative to the wiper blade support 30.

Figure 4:
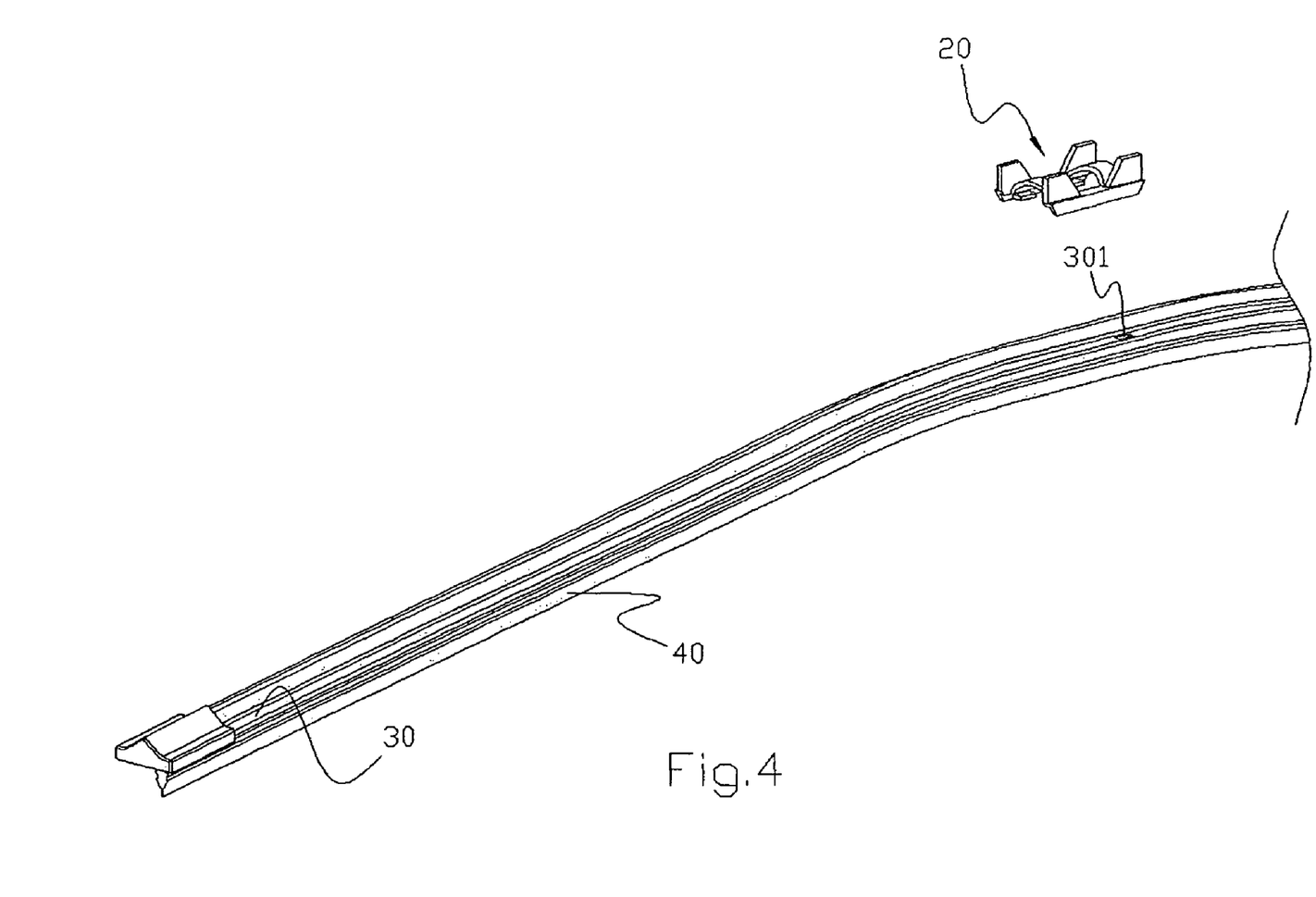
FIG. 4 is a perspective view of an embodiment of the present disclosure.

With reference to FIG. 4, a bridge base 20 is buckled to the positioning hole 301 so as to be mounted on the wiper blade support 30, where a wiper blade 40 is already attached to the wiper blade support 30.

Figure 5:
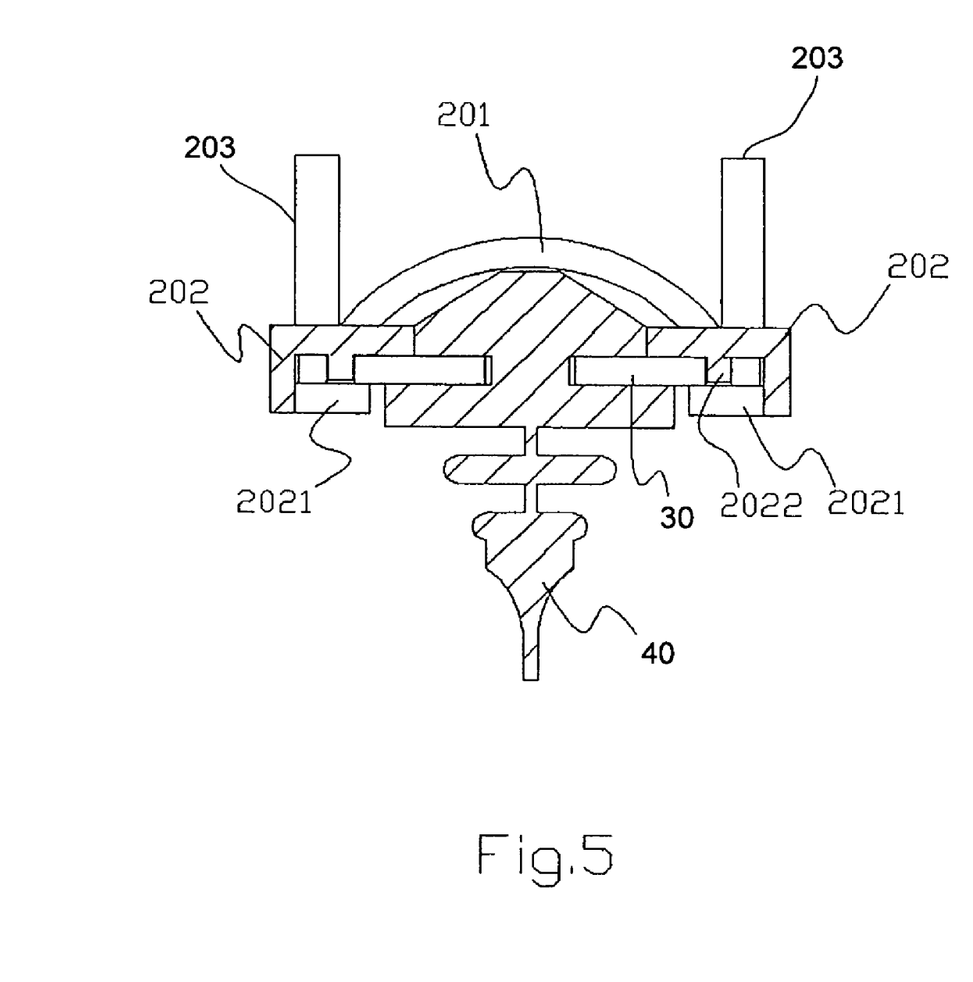
FIG. 5 is a cross sectional view of an embodiment of the present disclosure.

With reference to FIG. 5, the bridge base 20 is well positioned on the wiper blade support 30 as it is mounted thereon because the inward surfaces of the buckle band 202 abut against the edge of the wiper blade support 30. Moreover, the horizontal pin 2021 covers the bottom surface of the wiper blade support 30 and the vertical tenons 2022 engage the positioning holes 301 of the wiper blade support 30. It is also shown in FIG. 5 that the wiper blade 40 is located between the bridge base 20 and wiper blade support 30 due to a prior assembly of the wiper blade 40 and wiper blade support 30. In addition, the assembly of bridge base 20 and wiper blade support 30 would become tighter after it goes through a stamping process.

Figure 6:
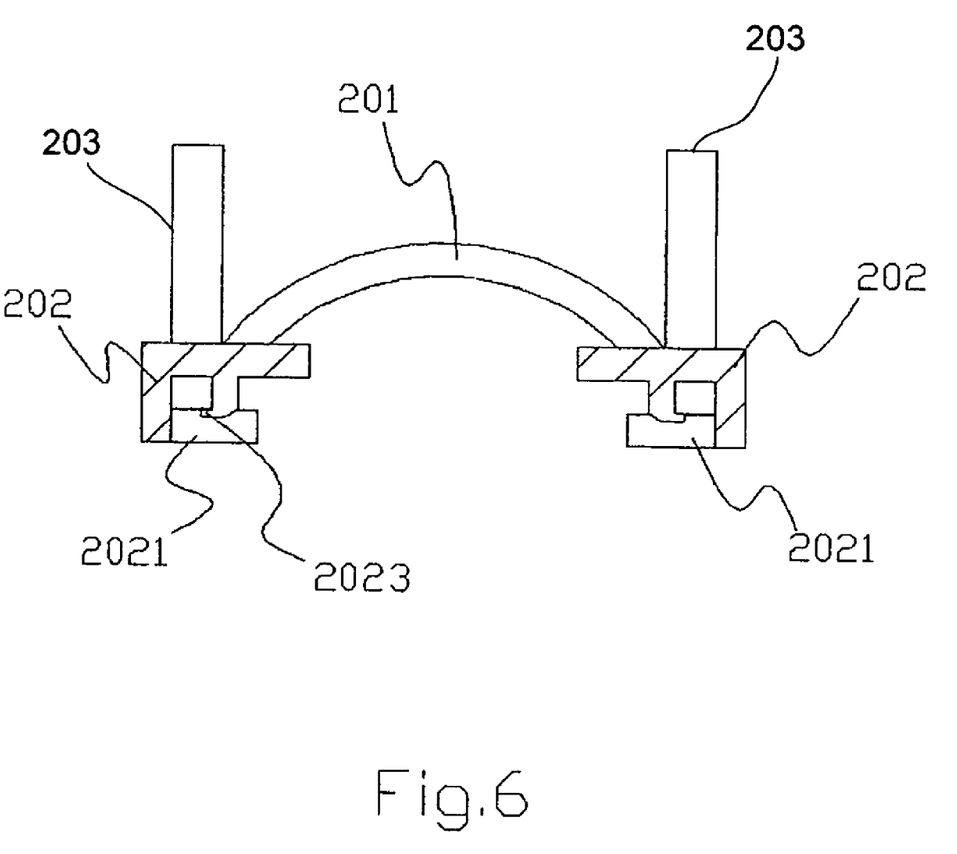
FIG. 6 is a cross sectional view of embodiment (I) of the present disclosure.

With reference to FIG. 6, the bridge base 20, is integrally formed and comprises a connection portion 201 and buckle bands 202 formed respectively on the two sides of the connection portion 201. The buckle bands 202 have a plurality of horizontal pins 2021, which are formed by folding the same inwardly from the bottom edge, and hooks 2023, which are vertically formed on the ends of the vertical tenons. The hooks not only position the bridge base 20 horizontally but also hook it to the wiper blade support 30 for a tight mounting.

Figure 7:
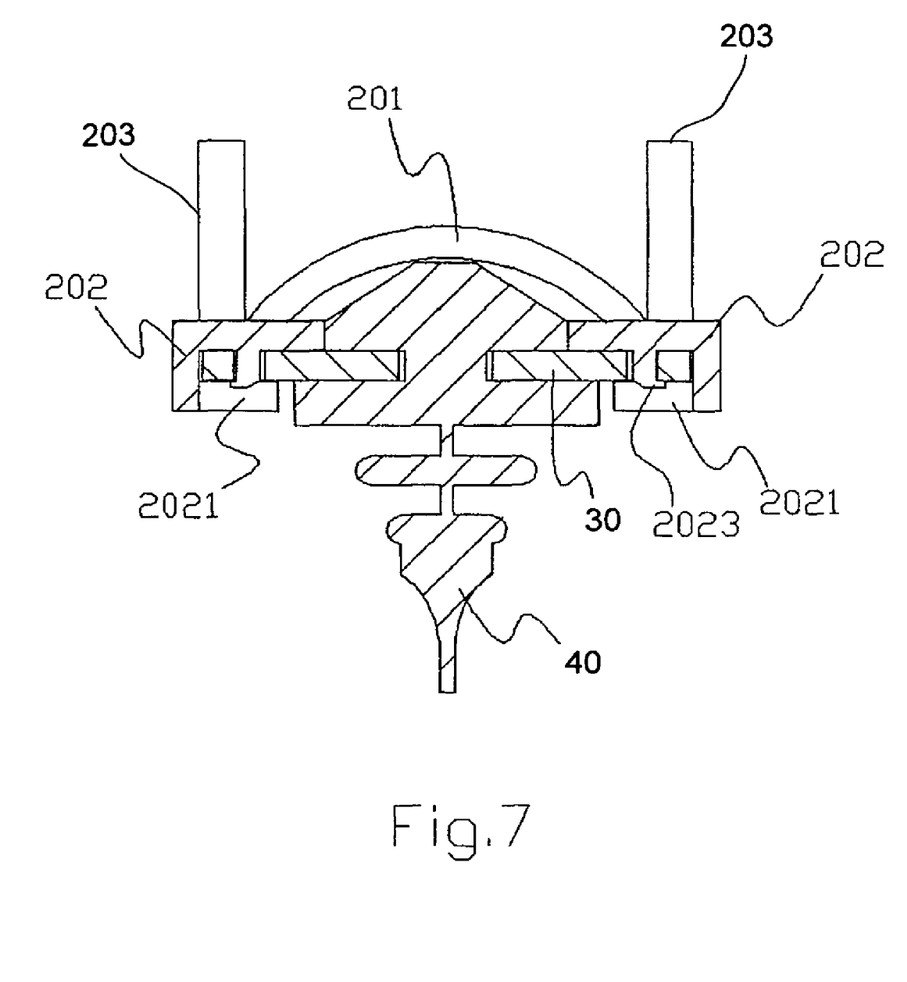
FIG. 7 is a cross sectional view of embodiment (I) of the present disclosure.

With reference to FIG. 7, the bridge base 20 is well positioned on the wiper blade support 30 as it is mounted thereon because the inward surfaces of the buckle bands 202 abut against the edges of the wiper blade support 30; the horizontal pins 2021 cover the bottom surface of the wiper blade support 30 and the hooks 2023 are hooked in the positioning holes 301 to hold the bottom surface of the wiper blade support. It is also shown in FIG. 7 that the wiper blade 40 is located between the bridge base 20 and wiper blade support 30 due to a prior assembly of the wiper blade 40 and wiper blade support 30.

Figure 8:
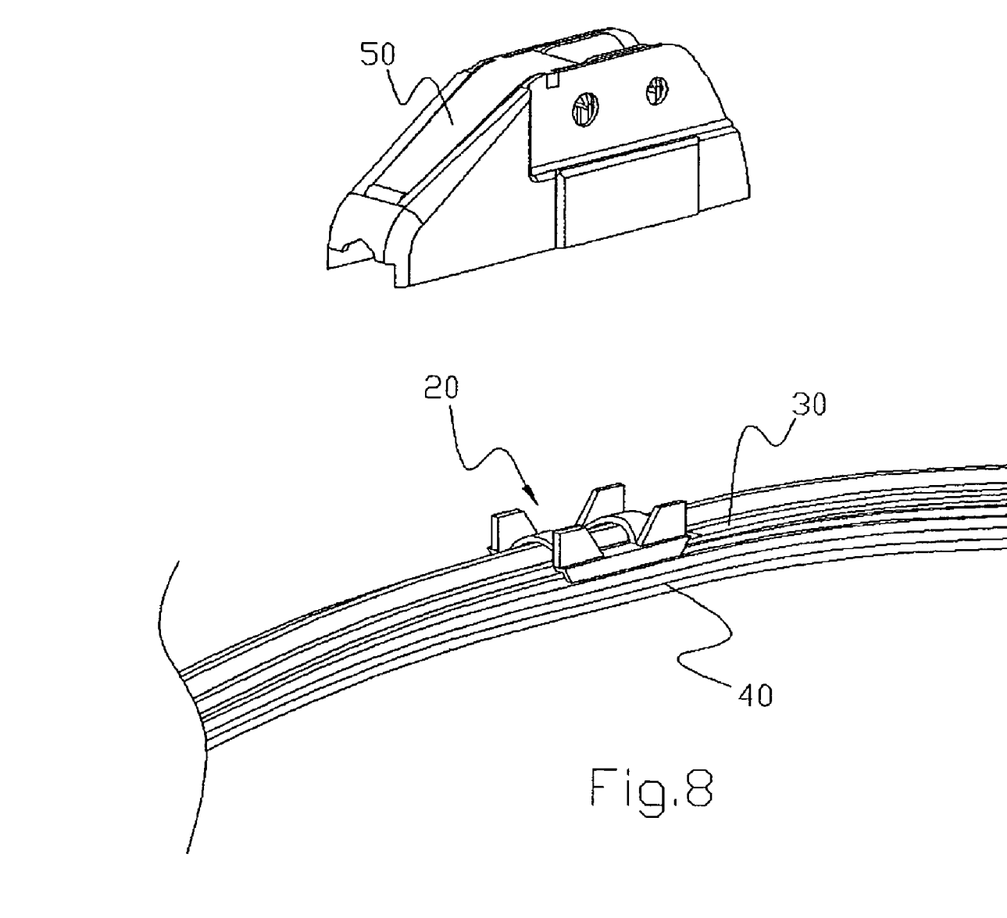
FIG. 8 is a perspective view of embodiment (II) of the present disclosure.

With reference to FIG. 8, a housing 50 is about to be mounted on top of the bridge base 20 that is assembled with a wiper blade support 30. The key function of the housing 50 is to connect a windshield wiper assembly to a wiper arm (not illustrated) for installing the windshield wiper assembly on a windshield. As shown in FIG. 8, the housing 50 encloses the bridge base 20 while being mounted thereon.

Figure 9:
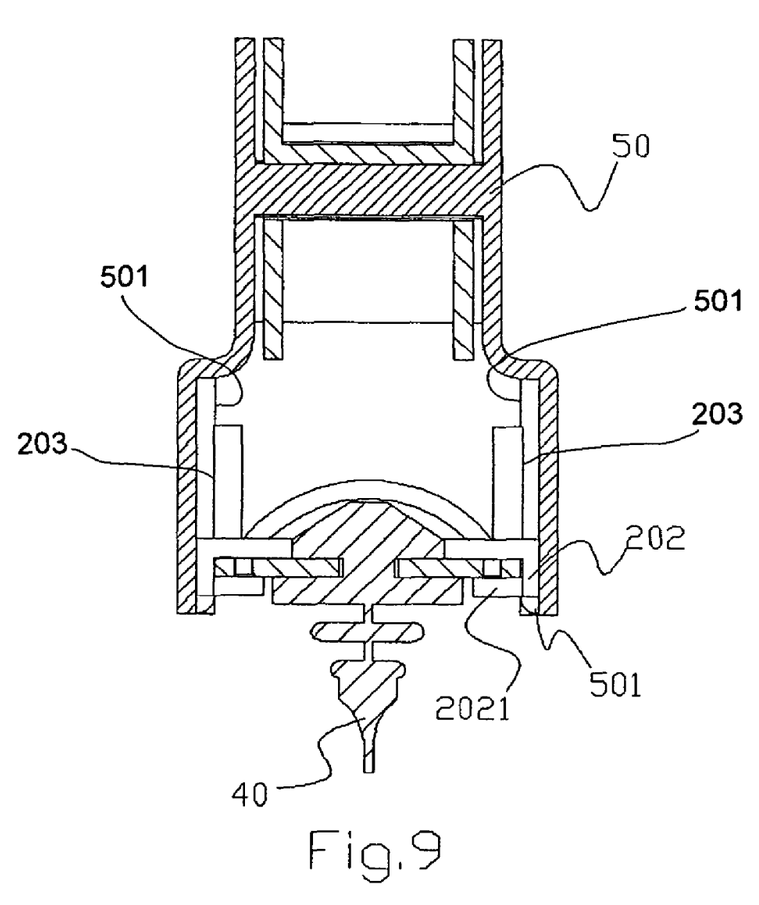
FIG. 9 is a cross sectional view of embodiment (II) of the present disclosure.

With reference to FIG. 9, the housing 50 is installed on bridge base 20 through buckling a plurality of buttons 501, which are formed on the bottom edges of the housing 50, to the bottom edges of buckle bands 202 on the bridge base 20. The extension arms 203 of the bridge base 20 engages the inner walls 501 of the housing 50 to further improve the engagement between the bridge base 20 and the housing 50. The foregoing embodiments exhibit that the bridge base 20 of the disclosure can be assembled with the housing of any (automobile) brand that has buttons on the bottom edge. As far as the wiper blade manufacturers are concerned, the invention would enable them to standardize the wiper blades in all aspects, except length, so as to drastically reduce mold costs. Therefore, it is objective of the disclosure to standardize the design of the bottom edge with regard to structure of the housing. Furthermore, such standardized design also achieves cost effectiveness in molding. As far as the consumers are concerned, they can select the housing according to their automobile brand when purchasing the windshield wiper assembly; in the case of wiper blade replacement, they only need to purchase the windshield wiper assembly (including the wiper blade, wiper blade support, and bridge base) that has the bridge base mounted in the factory. The assembly mounted with a bridge base also provides the consumers with installation conveniences and cost-saving benefits. As far as the vendors are concerned, the bridge base of the invention facilitates inventory control and reduces inventory costs because the vendors only need to stock up on windshield wiper assembly (including the wiper blade, wiper blade support, and bridge base) and housings of various (automobile) brands.

Figure 10:
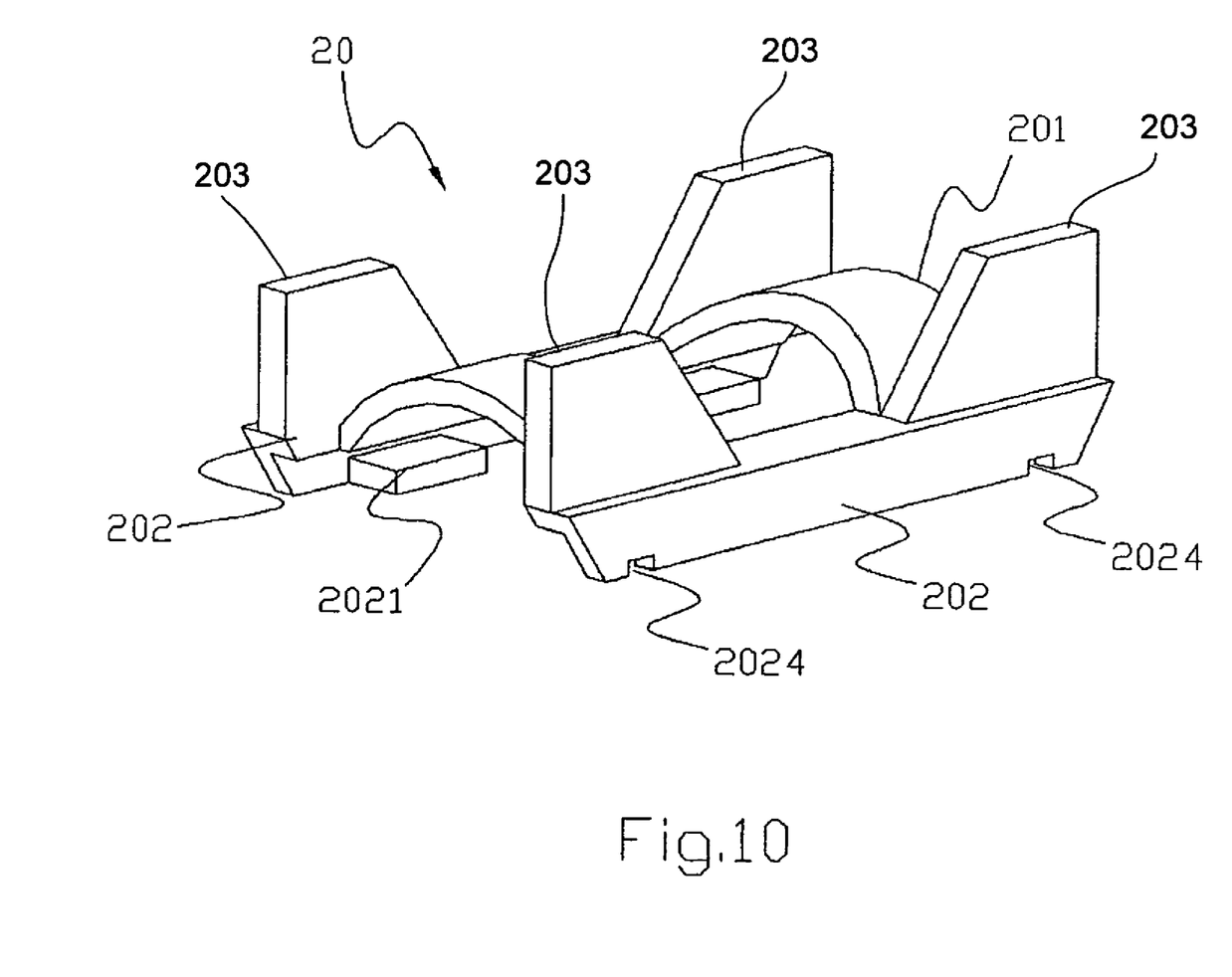
FIG. 10 is a perspective view of embodiment (III) of the present disclosure.

With reference to FIG. 10, the buckle bands 202 of the bridge base 20 each have grooves 2024 to allow for insertion of the buttons 501 of the housing 50 so as to assure a more secured assembly of the housing 50 and bridge base 20.

This design may assist the wiper blade manufacturers in achieving cost effectiveness because the male mold is applicable to the bottom edge of any housing. On the other hand, as far as the users are concerned, the bridge base of the invention allows a separate purchase of the wiper blade with a bridge base to match any housings selected according to automobile models. Besides, as far as the vendors are concerned, the bridge base of the invention may assist them in reducing the inventory cost because they only need to focus on stocking wiper blade supports of different lengths and housings of various (automobile) brands. More particularly, the selection available to consumers is beyond comparison because the bridge base of the invention maximizes alternatives to such a combination.

To sum up, the bridge base of the invention effectively connect a wiper blade support to any housing so as to achieve the objectives of using one specific wiper blade support to match the housing of any (automobile) brand, as well as cost effectiveness in production, purchasing, and sales and also maximize selections in connecting the wiper blade support to the housing.

New characteristics and advantages of the invention covered by this document have been set forth in the foregoing description. Understanding is sought however, that the drawings are for the purpose of illustration only and are not intended to the invention. Changes in methods, shapes, structures, or devices may be made by those who are skilled in the art without departing from the scope of the invention.

What is claimed is:

1. A bridge base comprising:
   a connection portion defining longitudinal sides;
   a pair of buckle bands provided on the longitudinal sides and adapted for mounting the bridge base to a wiper blade support,
   at least one vertical tenon for horizontally positioning the bridge base on a wiper blade support, the at least one vertical tenon including a hook at an end of the at least one vertical tenon for extending through a positioning hole of the wiper blade support and for fastening the bridge base to the wiper blade support,
   wherein the bridge base is configured to engage a housing that encloses the bridge base therein so that a wiper arm is connected to the wiper blade support through the housing.

2. The bridge base of claim 1, further comprising at least one horizontal pin for vertically positioning the bridge base on the wiper blade support.

3. The bridge base of claim 2, wherein the buckle bands each include an inward surface adapted for abutting against longitudinal edges of the wiper blade support and a bottom surface disposed above the wiper blade support.

4. The bridge base of claim 3, wherein the at least one vertical tenon extends downwardly from the bottom surface.

5. The bridge base of claim 3, wherein the at least one horizontal pin extends from the inward surface and contacts a bottom surface of the wiper blade support.

6. The bridge base of Clam 1, wherein the bridge base is made of metal.

7. The bridge base of claim 1, wherein the bridge base is integrally formed.

8. A wiper blade assembly, comprising:
   a wiper blade support defining at least one positioning hole; and
   a bridge base mounted on the wiper blade support, the bridge base including
   a connection portion defining longitudinal sides,
   a pair of buckle bands provided on the longitudinal sides and adapted for mounting the bridge base to the wiper blade support, and at least one vertical tenon inserted into the positioning hole of the wiper blade support for horizontally positioning the bridge base on the wiper blade support, the at least one vertical tenon including a hook at an end, the hook being inserted into the positioning hole for fastening the bridge base on the wiper blade support, wherein the bridge base is adapted to mount a wiper arm to the wiper blade support.

9. The wiper blade assembly of claim 8, wherein the connection portion extends transversely of the wiper blade support and connects the pair of buckle bands.

10. The wiper blade assembly of claim 9, further comprising a housing removably mounted on the bridge base.

11. The wiper blade assembly of claim 10, wherein the housing includes horizontal buttons for connecting the housing to the bridge base.

12. The wiper blade assembly of claim 8, wherein the buckle bands include inward surfaces abutting against the longitudinal edges of the wiper blade support and a plurality of horizontal pins extending from the inward surfaces of the buckle bands for vertically positioning the bridge base on the wiper blade support.

13. The wiper blade assembly of claim 8, wherein the at least one vertical tenon extends downwardly from a bottom surface of the buckle bands.

14. The wiper blade assembly of claim 13, wherein the hook of the at least one vertical tenon is configured to be hooked to a bottom surface of the wiper blade support.

15. A wiper blade assembly comprising:
a wiper blade support;
a bridge base mounted on the wiper blade support, the bridge base including a pair of buckle bands for engaging the wiper blade support, at least a pair of extension arms extending from the buckle bands, and a connection portion extending transversely of the wiper blade support and connecting the pair of buckle bands; and
a housing removably mounted on the bridge base, the housing including horizontal buttons for connecting the housing to the bridge base, the extension arms engaging the housing,
wherein the horizontal buttons are snapped on bottom edges of the buckle bands.

16. The wiper blade assembly of claim 15, wherein the buckle bands each have a groove formed at the bottom edge, the horizontal buttons snapped into the grooves.

17. The wiper blade assembly of claim 15, further comprising: a wiper arm mounted to the housing.

18. A wiper blade assembly comprising:
a wiper blade support;
a bridge base mounted on the wiper blade support, the bridge base including a pair of buckle bands for engaging the wiper blade support, and a connection portion extending transversely of the wiper blade support and connecting the pair of buckle bands;
a housing removably mounted on the bridge base, the housing including horizontal buttons for connecting the housing to the bridge base,
wherein the horizontal buttons are snapped on bottom edges of the buckle bands, and wherein the wiper blade support defines at least one positioning hole and the bridge base includes at least one tenon inserted into the at least one positioning hole, the at least one tenon including a hook at an end to be hooked to the wiper blade support to fasten the bridge base on the wiper blade support.

* * * * *